J. P. PASTRE.
CAR WHEEL.
APPLICATION FILED DEC. 3, 1908.
961,639.
Patented June 14, 1910.
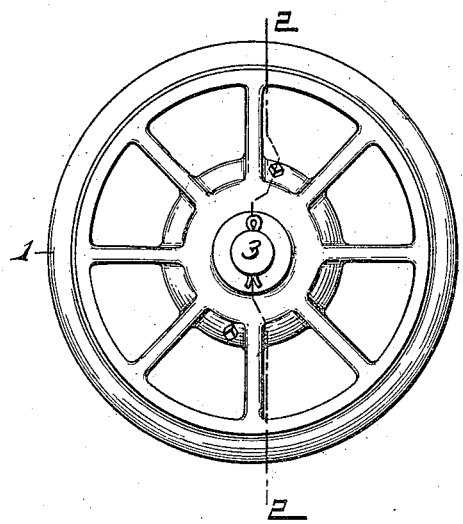
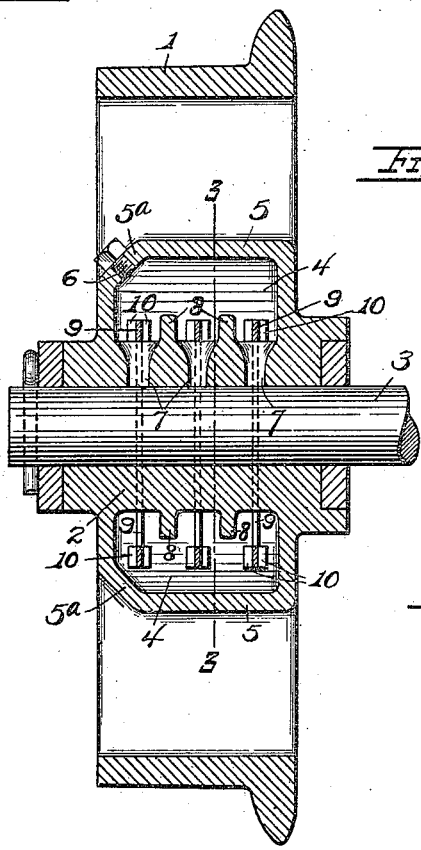
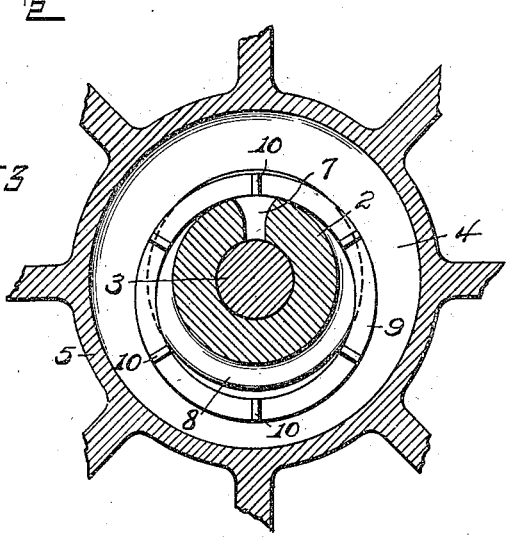
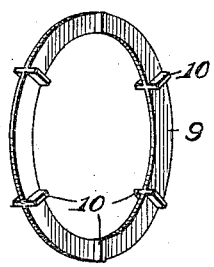
WITNESSES:
INVENTOR
J. Philip Pastre
By
ATTORNEY.

UNITED STATES PATENT OFFICE.

JOHN PHILIP PASTRE, OF STEUBENVILLE, OHIO.

CAR-WHEEL.

961,639.  Specification of Letters Patent.  Patented June 14, 1910.

Application filed December 3, 1908. Serial No. 465,816.

*To all whom it may concern:*

Be it known that I, JOHN PHILIP PASTRE, a citizen of the United States of America, and resident of Steubenville, county of Jefferson, and State of Ohio, have invented certain new and useful Improvements in Car-Wheels, of which the following is a specification.

This invention relates to improvements in car wheels, and more particularly to car-wheels of the self-lubricating type.

The primary object of the invention is to provide a car wheel wherein an annular chamber for containing lubricating oil is provided about the hub and wherein ducts are provided which lead through the hub for admitting oil from said chamber to the bearing surface of the axle upon which the wheel rotates. And a further object of the invention is to provide oil-splashing means whereby oil is conveyed to said ducts.

With these and other objects in view, the invention finally consists in the particular construction, arrangement and combination of parts which will hereinafter be fully described, reference being had to the accompanying drawings, forming a part of this specification, in which—

Figure 1 is a side elevation of a car wheel embodying my invention; Fig. 2 is an enlarged section of the same on the line 2—2, Fig. 1; Fig. 3 is a section on the line 3—3, Fig. 2; and Fig. 4 is a perspective view of a splasher ring.

Referring to said drawings, in which like reference-characters designate like parts throughout the several views—1 indicates the car wheel, which has its hub 2 rotatable upon an axle 3. Encircling the hub so as to form an annular chamber 4 about said hub is an inclosing wall 5, which, on the outer side of the wheel, is inclined at an angle of substantially 45°, as shown at 5ª. In said inclined portion of the wall is provided one or more plugged openings 6 through which oil is introduced into the chamber 4.

In the hub 2 is provided one or more ducts 7, three being shown in the drawings, through which oil carried in the chamber 4 is conducted to the bearing surface of the axle 3. Located between said ducts and extending annularly about the axle 3 are ribs 8, the purpose of which will hereinafter be explained. Experience has demonstrated that oil contained in an annular chamber formed about a hub will, owing to centrifugal force exerted when the wheel is in motion, rather be prevented from entering oil ducts in the hub than otherwise. In order to partially overcome this tendency and provide means for directing oil into said ducts 7, a plurality of rings 9 is provided about the hub, one ring for each duct, which rings are of considerably greater internal diameter than the external diameter of the hub laterally of the ribs 8, said ribs serving to separate said rings and preserve the relative positions of said rings with relation to said ducts.

The width of the body or band portion of each ring 9 is materially less than that of the mouth of the duct which it overlies, or with which it is in alinement, so that ready access of oil to said duct is had. Mounted upon each ring, or, preferably, integral with each ring, is a plurality of laterally-directed blades 10, which, when the wheel revolves slowly, are each adapted to dip up a small quantity of the oil and deposit it upon the outer surface of the hub, and, when the position of a blade coincides with, or overlies, the duct, to deposit the same in the latter, whence it is conducted to the axle. When the wheel revolves rapidly and the centrifugal force tends particularly to prevent access of oil to the ducts, the blades 10 serve as splashers whereby the oil is agitated and splashed over the hub in such manner as to cause said ducts to be constantly supplied.

It will be seen that even though the quantity of oil contained in the chamber 4 be very limited, or wholly insufficient to, under ordinary circumstances, enter the ducts, the blades of the rings will constantly dip into the oil and splash the latter to an extent which will cause some thereof to enter said ducts for keeping the axle lubricated.

Having thus described my invention, what I claim as new, and desire to secure by Letters Patent, is—

1. In a car wheel, a hub provided with an encircling oil-chamber and having ducts in its periphery, rings loosely encircling said hub and overlying said ducts, said rings being of materially less width than said ducts and carrying laterally directed blades, and means for maintaining said rings in position with relation to said ducts.

2. In a car wheel, a hub having ducts therein and provided with an encircling oil-chamber, rings loosely encircling said hub contiguous to said ducts, said hub having annular ribs formed thereon between said ducts whereby said rings are maintained in position with relation to said ducts, said rings being of materially less width than the space between the ribs and carrying laterally-directed oil-splashing blades.

3. In a car wheel, a hub having a plurality of ducts therein and having an oil-chamber surrounding it, a plurality of rings loosely encircling said hub contiguous to said ducts, said hub having annular ribs formed thereon between said ducts whereby said rings are maintained in proper position with relation to said ducts, said rings having blades which are directed laterally in opposite directions.

In testimony whereof I affix my signature in presence of two subscribing witnesses.

J. PHILIP PASTRE.

Witnesses:
 FRED M. COLEMAN,
 H. SIMON.